United States Patent
Park et al.

(10) Patent No.: US 9,209,490 B2
(45) Date of Patent: Dec. 8, 2015

(54) ELECTROLYTE FOR RECHARGEABLE LITHIUM BATTERY, AND RECHARGEABLE LITHIUM BATTERY INCLUDING SAME

(71) Applicant: SAMSUNG SDI CO., LTD., Yongin-si, Gyeonggi-do (KR)

(72) Inventors: Seong-Ah Park, Yongin-si (KR); Hyun-Jun Shin, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 70 days.

(21) Appl. No.: 14/133,857

(22) Filed: Dec. 19, 2013

(65) Prior Publication Data

US 2014/0205913 A1    Jul. 24, 2014

(30) Foreign Application Priority Data

Jan. 23, 2013 (KR) ..................... 10-2013-0007665

(51) Int. Cl.
*H01M 10/0569* (2010.01)
*H01M 10/052* (2010.01)
*H01M 10/0567* (2010.01)

(52) U.S. Cl.
CPC ........ *H01M 10/0569* (2013.01); *H01M 10/052* (2013.01); *H01M 10/0567* (2013.01); *H01M 2300/0042* (2013.01); *Y02E 60/122* (2013.01)

(58) Field of Classification Search
CPC ............ H01M 4/525; H01M 10/0569; H01M 10/052; H01M 10/0567; H01M 2300/0042; C01D 15/02; C30B 7/14; C01G 53/04; C01G 53/50; C01G 53/006; C01P 2004/50; C01P 2004/54; C01P 2004/20; C01P 2004/51; C01P 2004/03; C01P 2004/32; Y02E 60/122
See application file for complete search history.

(56) References Cited

U.S. PATENT DOCUMENTS

| | | |
|---|---|---|
| 2002/0102466 A1 | 8/2002 | Hwang et al. |
| 2005/0227143 A1 | 10/2005 | Amine et al. |
| 2006/0147796 A1* | 7/2006 | Miura et al. ................. 429/209 |
| 2008/0038645 A1 | 2/2008 | Kolosnitsyn et al. |
| 2010/0273065 A1* | 10/2010 | Lee et al. ..................... 429/332 |

FOREIGN PATENT DOCUMENTS

| | | |
|---|---|---|
| KR | 2002-0008705 A | 1/2002 |
| KR | 10-2006-0047152 A | 5/2006 |
| KR | 10-2009-0037932 A | 4/2009 |
| KR | 10-2012-0105338 A | 9/2012 |

* cited by examiner

*Primary Examiner* — Patrick Ryan
*Assistant Examiner* — Aaron Greso
(74) *Attorney, Agent, or Firm* — Lee & Morse, P.C.

(57) ABSTRACT

An electrolyte for a rechargeable lithium battery includes a lithium salt and a non-aqueous organic solvent. The non-aqueous organic solvent includes about 1 volume % to about 40 volume % of ethylene carbonate, about 1 volume % to about 50 volume % of ethyl propionate, about 1 volume % to about 50 volume % of diethyl carbonate, and about 1 volume % to about 40 volume % of propylene carbonate.

11 Claims, 5 Drawing Sheets

ELECTROLYTE FOR RECHARGEABLE LITHIUM BATTERY, AND RECHARGEABLE LITHIUM BATTERY INCLUDING SAME

CROSS-REFERENCE TO RELATED APPLICATION

Korean Patent Application No. 10-2013-0007665 filed on Jan. 23, 2013, in the Korean Intellectual Property Office, and entitled: "ELECTROLYTE FOR RECHARGEABLE LITHIUM BATTERY, AND RECHARGEABLE LITHIUM BATTERY INCLUDING SAME," is incorporated by reference herein in its entirety.

BACKGROUND

1. Field

Embodiments relate to an electrolyte for a rechargeable lithium battery and a rechargeable lithium battery including the same.

2. Description of the Related Art

Lithium rechargeable batteries have recently drawn attention as a power source for small portable electronic devices. Lithium rechargeable batteries use an organic electrolyte and thereby have twice or more the discharge voltage than a conventional battery using an alkali aqueous solution, and accordingly have high energy density.

SUMMARY

Embodiments are directed to an electrolyte for a rechargeable lithium battery including a lithium salt and a non-aqueous organic solvent. The non-aqueous organic solvent includes about 1 volume % to about 40 volume % of ethylene carbonate, about 1 volume % to about 50 volume % of ethyl propionate, about 1 volume % to about 50 volume % of diethyl carbonate, and about 1 volume % to about 40 volume % of propylene carbonate.

The non-aqueous organic solvent may include about 10 volume % to about 40 volume % of ethylene carbonate, about 10 volume % to about 50 volume % of ethyl propionate, about 10 volume % to about 50 volume % of diethyl carbonate, and about 1 volume % to about 30 volume % of propylene carbonate.

The ethyl propionate may be included in a same amount as or in a greater amount than, the propylene carbonate.

The ethyl propionate and the propylene carbonate may be included at a volume ratio of about 1:1 to about 5:1. The ethyl propionate and the propylene carbonate may be included at a volume ratio of about 1.3:1 to about 3.5:1.

The electrolyte may further include an additive. The additive may include fluoroethylene carbonate, vinylethylene carbonate, propane sultone, succinonitrile, adiponitrile, or a combination thereof.

The additive may be included in an amount of about 0.1 parts by weight to about 20 parts by weight based on 100 parts by weight of the non-aqueous organic solvent.

Embodiments are also directed to a rechargeable lithium battery including a positive electrode, a negative electrode, and the electrolyte.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
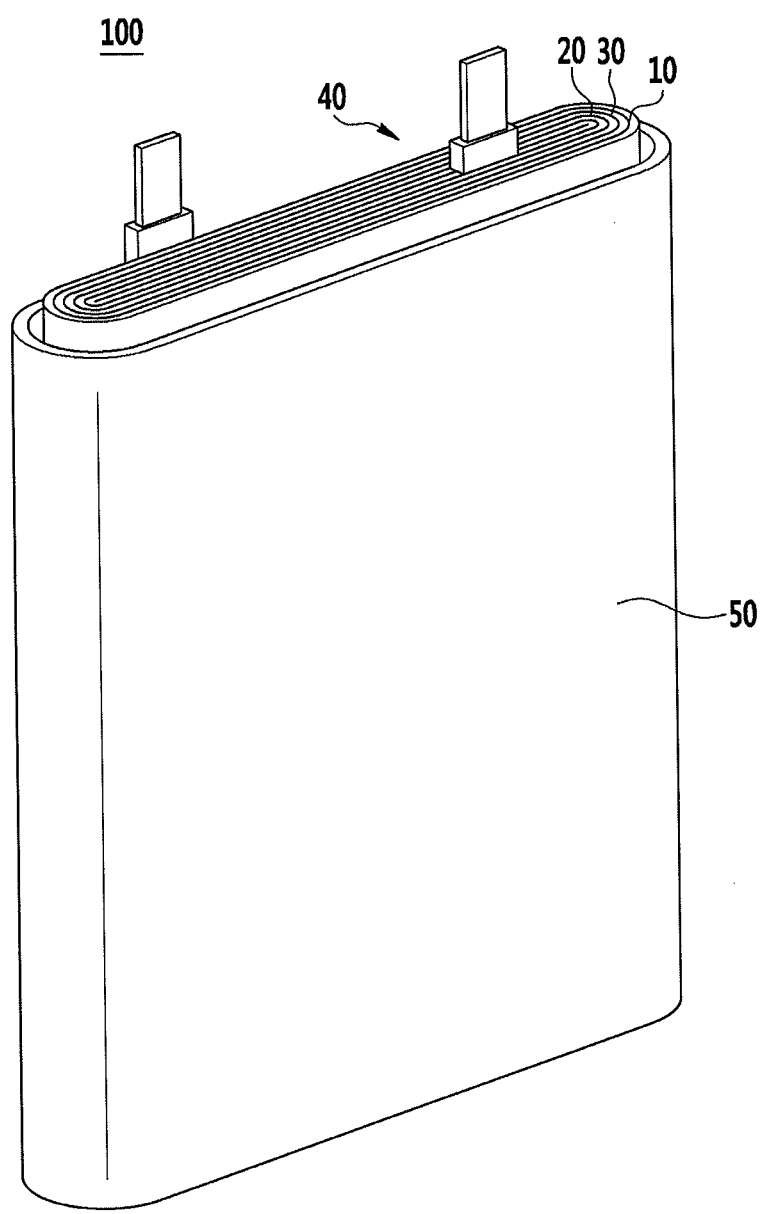
FIG. 1 illustrates an exploded perspective view of a rechargeable lithium battery according to an embodiment.

Exemplary embodiments will hereinafter be described in detail. However, these embodiments are only exemplary and are not intended to be limiting.

The electrolyte for a rechargeable lithium battery includes a lithium salt and a non-aqueous organic solvent.

The non-aqueous organic solvent acts as a medium for transmitting ions taking part in the electrochemical reaction of the battery.

The non-aqueous organic solvent according to one embodiment includes ethylene carbonate, ethyl propionate, diethyl carbonate, and propylene carbonate.

The ethylene carbonate may be included in an amount of about 1 volume % to about 40 volume %, for example, about 10 volume % to about 40 volume % or about 15 volume % to about 35 volume % based on the total amount of the non-aqueous organic solvent. The ethyl propionate may be included in an amount of about 1 volume % to about 50 volume %, for example, about 10 volume % to about 50 volume %, or about 15 volume % to about 45 volume %, or about 25 volume % to about 35 volume % based on the total amount of the non-aqueous organic solvent. The diethyl carbonate may be included in an amount of about 1 volume % to about 50 volume %, for example, or about 10 volume % to about 50 volume %, or about 20 volume % to about 45 volume % based on the total amount of the non-aqueous organic solvent. The propylene carbonate may be included in an amount of about 1 volume % to about 40 volume %, for example, about 1 volume % to about 30 volume %, or about 5 volume % to about 25 volume %, or about 5 volume % to about 15 volume % based on the total amount of the non-aqueous organic solvent. When the non-aqueous organic solvent has compositions within the above ranges, battery expansion at a high voltage and a high temperature may be hindered or prevented, and high temperature cycle-life characteristics and high-rate charge and discharge characteristics may be improved.

The ethyl propionate may be included in the same amount as the propylene carbonate or may be included in a greater amount than the propylene carbonate. The ethyl propionate and the propylene carbonate may be included at a volume ratio of about 1:1 to about 5:1, for example, about 1:1 to about 4:1, or about 1.3:1 to about 3.5:1, or about 2.5:1 to about 3.5:1. When the ethyl propionate and the propylene carbonate are mixed in the above ratio ranges, battery expansion at a high voltage and a high temperature may be hindered or prevented and high temperature cycle-life characteristics and high-rate charge and discharge characteristics may be improved.

The lithium salt is dissolved in the non-aqueous organic solvent. The lithium solvent supplies lithium ions in the battery, operates a basic operation of a rechargeable lithium battery, and improves lithium ion transportation between positive and negative electrodes.

Examples of the lithium salt may include at least one supporting salt selected from $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiCl, LiI, $LiB(C_2O_4)_2$ (lithium bis(oxalato) borate: LiBOB), or a combination thereof.

The lithium salt may be used at a concentration of about 0.1M to about 2.0M. When the lithium salt is included at the above concentration range, electrolyte performance and lithium ion mobility may be enhanced due to optimal electrolyte conductivity and viscosity.

The electrolyte may further include an additive. The additive may include fluoroethylene carbonate, vinylethylene carbonate, propane sultone, succinonitrile, adiponitrile, or a combination thereof.

The additive may be may be included in an amount of about 0.1 parts by weight to about 20 parts by weight, for example, about 0.5 parts by weight to about 10 parts by weight, or about 1 part by weight to about 7 parts by weight based on 100 parts by weight of the non-aqueous organic solvent. When the additive is included within the above ranges, cycle-life characteristics and high-rate charge and discharge characteristics may be improved.

Hereinafter, referring to FIG. 1, a rechargeable lithium battery including the electrolyte is described.

FIG. 1 is an exploded perspective view of a rechargeable lithium battery according to an embodiment The rechargeable lithium battery may prismatic type battery. The rechargeable lithium battery may be a diverse battery such as a lithium polymer battery, a cylindrical battery, or the like.

Referring to FIG. 1, a rechargeable lithium battery 100 according to one embodiment may include an electrode assembly 40 fabricated by winding a separator 30 interposed between a positive electrode 10 and a negative electrode 20, and a case 50 housing the electrode assembly 40. An electrolyte (not shown) is impregnated in the positive electrode 10, the negative electrode 20, and the separator 30.

The electrolyte may be the same as described above.

The positive electrode 10 may include a current collector and a positive active material layer disposed on the current collector. The positive active material layer may include a positive active material, a binder, and optionally, a conductive material.

The current collector may include Al (aluminum), as an example.

The positive active material includes may include intercalation compounds that reversibly intercalate and deintercalate lithium ions. The positive active material may include a composite oxide including at least one selected from the group of cobalt, manganese, and nickel, as well as lithium. In one embodiment, the following compounds may be used, as examples:

$Li_aA_{1-b}B_bD_2$ ($0.90 \le a \le 1.8$ and $0 \le b \le 0.5$); $Li_aE_{1-b}B_bO_{2-c}D_c$ ($0 \le a \le 1.8$, $0 \le b \le 0.5$, $0 \le c \le 0.05$); $LiE_{2-b}B_bO_{4-c}D_c$ ($0 \le b \le 0.5$, $0 \le c \le 0.05$); $Li_aNi_{1-b-c}Co_bB_cD_\alpha$ ($0.90 \le a \le 1.8$, $0 \le b \le 0.5$, $0 \le c \le 0.05$, $0 < \alpha \le 2$); $Li_aNi_{1-b-c}Co_bB_cO_{2-\alpha}F_\alpha$ ($0.90 \le a \le 1.8$, $0 \le b \le 0.5$, $0 \le c \le 0.05$, $0 < \alpha < 2$); $Li_aNi_{1-b-c}Co_bB_cO_{2-\alpha}F_2$ ($0.90 \le a \le 1.8$, $0 \le b \le 0.5$, $0 \le c \le 0.05$, $0 < \alpha < 2$); $Li_aNi_{1-b-c}Mn_bB_cD_\alpha$ ($0.90 \le a \le 1.8$, $0 \le b \le 0.5$, $0 \le c \le 0.05$, $0 < \alpha \le 2$); $Li_aNi_{1-b-c}Mn_bB_cO_{2-\alpha}F_\alpha$ ($0.90 \le a \le 1.8$, $0 \le b \le 0.5$, $0 \le c \le 0.05$, $0 < \alpha < 2$); $Li_aNi_{1-b-c}Mn_bB_cO_{2-\alpha}F_2$ ($0.90 \le a \le 1.8$, $0 \le b \le 0.5$, $0 \le c \le 0.05$, $0 < \alpha < 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dGeO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMnG_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above chemical formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof. It is to be understood that B, F, and I as used in the preceding paragraph represent variables as further defined in this paragraph, rather than being the chemical symbols for boron, fluorine and iodine.

The positive active material may include the positive active material with the coating layer, or a compound of the active material and the active material coated with the coating layer. The coating layer may include at least one coating element compound selected from the group of an oxide of the coating element, a hydroxide of the coating element, an oxyhydroxide of the coating element, an oxycarbonate of the coating element, and a hydroxycarbonate of the coating element. The compound for the coating layer may be either amorphous or crystalline. The coating element included in the coating layer may be selected from Mg, Al, Co, K, Na, Ca, Si, Ti, V, Sn, Ge, Ga, B, As, Zr, or a mixture thereof. The coating process may include any suitable conventional processes as long as the coating process does not cause any side effects on the properties of the positive active material (e.g., spray coating, immersing).

The binder improves binding properties of the positive active material particles to each other and to a current collector. Examples of the binder include polyvinyl alcohol, carboxylmethyl cellulose, hydroxypropyl cellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material improves electrical conductivity of a negative electrode. Any suitable electrically conductive material that does not cause a chemical change can be used as a conductive agent. Examples of the conductive material include natural graphite, artificial graphite, carbon black, acetylene black, ketjen black, a carbon fiber, a metal powder or a metal fiber of copper, nickel, aluminum, silver, and the like, or a polyphenylene derivative, which may be used singularly or as a mixture thereof.

The negative electrode 20 includes a current collector and a negative active material layer disposed thereon.

The current collector may include a copper foil, a nickel foil, a stainless steel foil, a titanium foil, a nickel foam, a copper foam, a polymer substrate coated with a conductive metal, or combinations thereof, as examples.

The negative active material layer may include a negative active material, a binder, and optionally, a conductive material.

The negative active material includes a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions may include a carbon material. The carbon material may be any suitable carbon-based negative active material for a lithium ion rechargeable battery. Examples of the carbon material include crystalline carbon, amorphous carbon, or mixtures thereof. The crystalline carbon may be non-shaped, or sheet, flake, spherical, or fiber shaped natural graphite or artificial graphite. The amorphous carbon may be a soft carbon, a hard carbon, mesophase pitch carbide, fired coke, or the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

Examples of the material being capable of doping/dedoping lithium include Si, a Si—C composite, $SiO_x$ ($0<x<2$), a Si—Y alloy (wherein Y is selected from an alkali metal, an alkaline-earth metal, Group 13 to 16 elements, a transition element, a rare earth element, and a combination thereof, and is not Si), Sn, a Sn—C composite, $SnO_2$, a Sn—Y alloy (wherein Y is selected from an alkali metal, an alkaline-earth metal, Group 13 to 16 elements, a transition element, a rare earth element, and a combination thereof, and is not Sn), or a mixture thereof. At least one of these materials may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include vanadium oxide, lithium vanadium oxide, or the like.

The binder improves binding properties of negative active material particles with one another and with a current collector. Examples of the binder include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material is included to improve electrode conductivity. Any suitable electrically conductive material that does not cause a chemical change may be used. Examples of the conductive material include carbon-based materials such as natural graphite, artificial graphite, carbon black, acetylene black, ketjen black, carbon fibers, or the like; metal-based materials of metal powder or metal fiber including copper, nickel, aluminum, silver, or the like; conductive polymers such as polyphenylene derivatives; or a mixture thereof.

The positive electrode and the negative electrode may be manufactured by a method including mixing an active material, a conductive material, and a binder into an active material composition and coating the composition on a current collector.

A solvent such as N-methylpyrrolidone may be used in manufacturing the positive and negative electrodes.

The separator 30 may include any materials suitable for use in a lithium battery to separate a negative electrode from a positive electrode and provide a transporting passage for lithium ions. The separator 30 may be made of a material having a low resistance to ion transportation and an excellent impregnatability for an electrolyte. For example, the material may be selected from a glass fiber, polyester, polyethylene, polypropylene, polytetrafluoroethylene (PTFE), or a combination thereof, and may have a form of a non-woven fabric or a woven fabric. For example, a polyolefin-based polymer separator such as polyethylene, polypropylene, or the like may be used for a lithium ion battery. In order to ensure the heat resistance or mechanical strength, a coated separator including a ceramic component or a polymer material may be used. Selectively, the separator 30 may have a mono-layered or multi-layered structure.

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further, it is to be understood that the embodiments are not limited to the particular details described in the Examples and Comparative Examples.

Preparing Electrolyte

Examples 1 to 4 and Comparative Examples 1 to 5

Each electrolyte was prepared by dissolving 1.15M $LiPF_6$ in a non-aqueous organic solvent mixed according to a composition in the following Table 1.

TABLE 1

| | Ethylene carbonate (volume %) | Ethyl propionate (volume %) | Diethyl carbonate (volume %) | Propylene carbonate (volume %) |
|---|---|---|---|---|
| Example 1 | 20 | 20 | 40 | 20 |
| Example 2 | 20 | 30 | 30 | 20 |
| Example 3 | 30 | 30 | 30 | 10 |
| Example 4 | 20 | 40 | 30 | 10 |
| Comparative Example 1 | 30 | 50 | 20 | — |
| Comparative Example 2 | — | 30 | 50 | 20 |
| Comparative Example 3 | 30 | 50 | — | 20 |
| Comparative Example 4 | 10 | 60 | 20 | 10 |
| Comparative Example 5 | 10 | 20 | 20 | 50 |

(Manufacture of Rechargeable Lithium Battery Cell)

A positive active material layer composition was prepared by mixing $LiCoO_2$, polyvinylidenefluoride (PVdF), and carbon black in a weight ratio of 97.45:1.25:1.3 and dispersing the mixture into N-methyl-2-pyrrolidone. The positive active material layer composition was coated onto a 12 μm-thick aluminum foil and then, the coated aluminum foil was dried and compressed, fabricating a positive electrode.

A negative active material layer composition was prepared by mixing graphite, styrene-butadiene rubber, and carboxylmethyl cellulose in a weight ratio of 98:1:1 and dispersing the mixture into water. The negative active material layer composition was coated onto a 8 μm-thick copper foil and then, dried and compressed, fabricating a negative electrode.

The positive and negative electrodes along with a 16 μm-thick polyethylene separator were spirally-wound and compressed and then, put into a 4.3 mm×44 mm×56 mm prismatic (1400 mA) can, fabricating a rechargeable lithium battery cell. Herein, each electrolyte according to Examples 1 to 4 and Comparative Examples 1 to 5 was respectively used.

Evaluation 1: High Temperature Cycle-Life Characteristics of Rechargeable Lithium Battery Cell The rechargeable lithium battery cells according to Examples 1 to 4 and Comparative Examples 1 to 5 were charged and discharged at 45° C. under the following conditions. After 500 times repeating this charge and discharge cycle, the rechargeable lithium battery cells were evaluated regarding discharge capacity depending on a cycle. The results are provided in FIG. 2.

Charge: 950 mA and 4.35V, 0.1 C and cut-off
Discharge: 1 C and 3.1V cut-off

Figure 2:
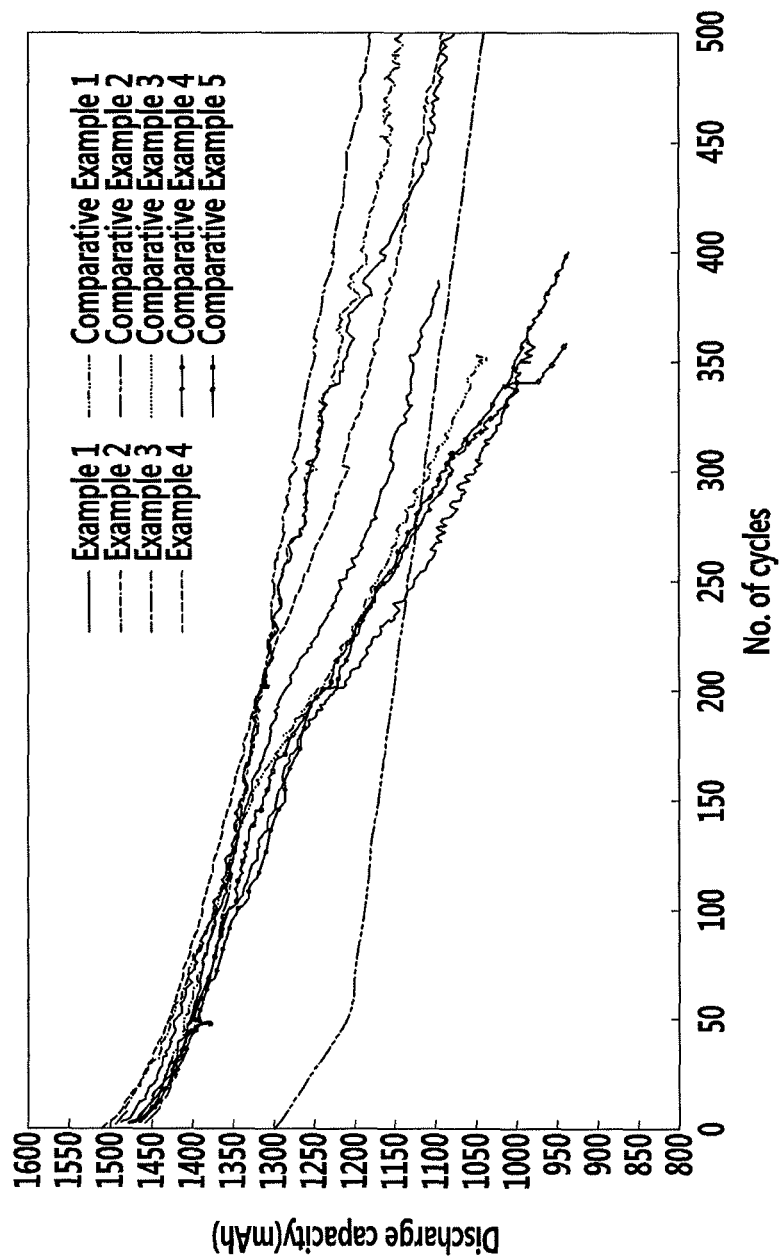
FIG. 2 illustrates a graph showing high temperature cycle-life characteristics of the rechargeable lithium battery cells according to Examples 1 to 4 and Comparative Examples 1 to 5.

FIG. 2 is a graph showing high temperature cycle-life characteristics of the rechargeable lithium battery cells according to Examples 1 to 4 and Comparative Examples 1 to 5.

Referring to FIG. 2, the rechargeable lithium battery cells that each included one of the electrolyte compositions prepared by using ethylene carbonate, ethyl propionate, diethyl carbonate, and propylene carbonate within a respective ratio range according to Examples 1 to 4 had excellent high temperature cycle-life characteristics compared with the rechargeable lithium battery cell including an electrolyte composition using no propylene carbonate according to Comparative Example 1, the rechargeable lithium battery cell including an electrolyte composition using no ethylene carbonate according to Comparative Example 2, the rechargeable lithium battery cell including an electrolyte composition using no diethyl carbonate according to Comparative Example 3, the rechargeable lithium battery cell including an electrolyte composition using an excessive amount of ethyl propionate according to Comparative Example 4, and the rechargeable lithium battery cell including an electrolyte composition using an excessive amount of propylene carbonate according to Comparative Example 5.

Evaluation 2: Thickness Changes of Rechargeable Lithium Battery Cell

The rechargeable lithium battery cells according to Examples 1 to 4 and Comparative Examples 1 to 5 were charged and discharged at 45° C. under the following conditions. After 500 times repeating the charge and discharge cycle, the rechargeable lithium battery cells were evaluated regarding thickness depending on cycles. The results are provided in FIG. 3.

Charge: 950 mA and 4.35V, 0.1 C and cut-off
Discharge: 1 C and 3.1V cut-off

Figure 3:
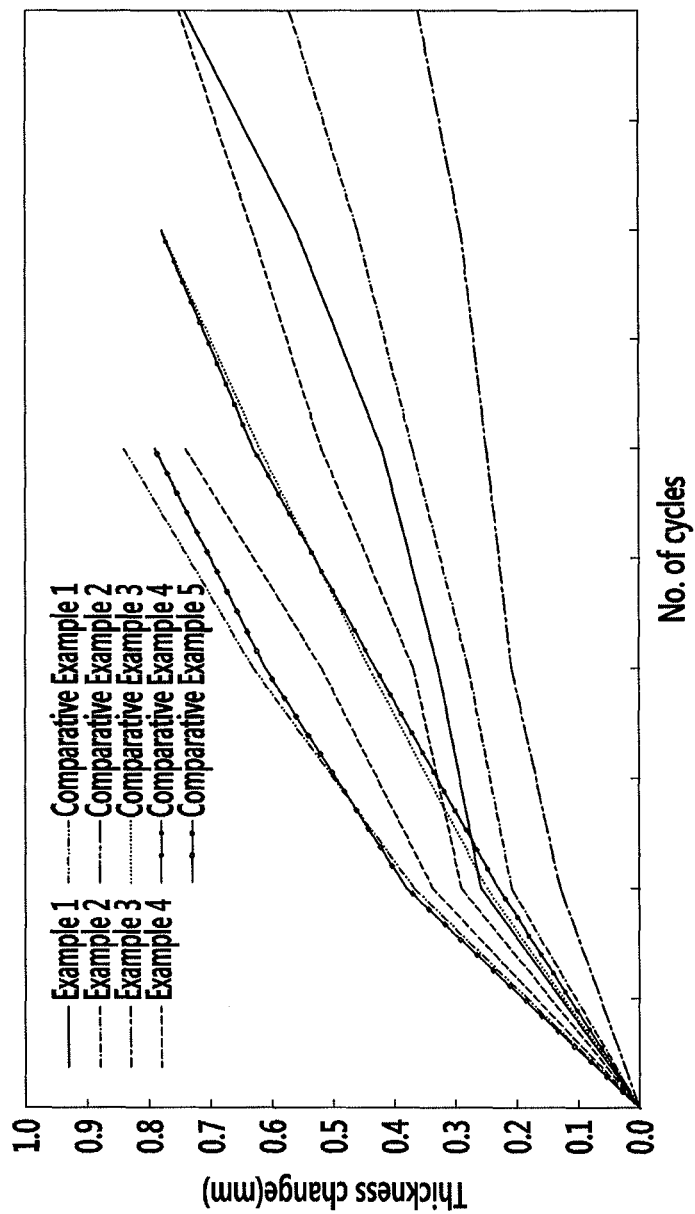
FIG. 3 illustrates a graph showing thickness changes of the rechargeable lithium battery cells according to Examples 1 to 4 and Comparative Examples 1 to 5.

FIG. 3 is a graph showing thickness changes of the rechargeable lithium battery cells according to Examples 1 to 4 and Comparative Examples 1 to 5.

Referring to FIG. 3, the rechargeable lithium battery cells that each included one of the electrolyte compositions using a mixture ethylene carbonate, ethyl propionate, diethyl carbonate, and propylene carbonate within a respective ratio range according to Examples 1 to 4 had small thickness change compared with the rechargeable lithium battery cells according to Comparative Examples 1 to 5.

Evaluation 3: High-Rate Discharge Characteristics of Rechargeable Lithium Battery Cell The rechargeable lithium battery cells according to Examples 1 to 4 and Comparative Example 1 were once charged and discharged under the following conditions and evaluated regarding high-rate discharge characteristics. The results are provided in FIG. 4.

Charge: 950 mA and 4.35V, 0.05 C and cut-off
Discharge: 1 C and 3.1V cut-off

Figure 4:
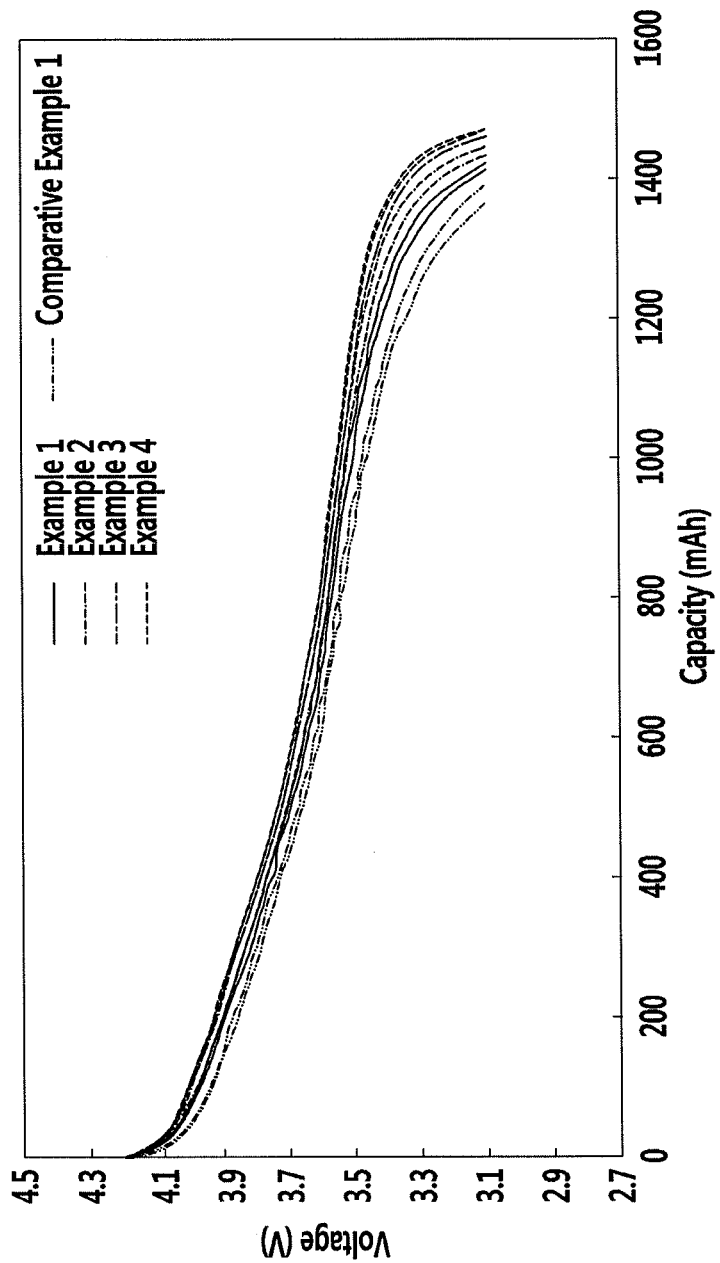
FIG. 4 illustrates a graph showing high-rate discharge characteristics of the rechargeable lithium battery cells according to Examples 1 to 4 and Comparative Example 1.

FIG. 4 is a graph showing high-rate discharge characteristics of the rechargeable lithium battery cells according to Examples 1 to 4 and Comparative Example 1.

Referring to FIG. 4, the rechargeable lithium battery cells that each included one of the electrolyte compositions using ethylene carbonate, ethyl propionate, diethyl carbonate, and propylene carbonate within a respective ratio range according to Examples 1 to 4 had excellent high-rate discharge characteristics compared with the rechargeable lithium battery cell including an electrolyte composition using no propylene carbonate according to Comparative Example 1.

Evaluation 4: Low Temperature Discharge Characteristics of Rechargeable Lithium Battery Cell The rechargeable lithium battery cells according to Examples 1 to 4 and Comparative Example 1 were once charged and discharged at 1 C up to 3.1V at −10° C. and evaluated regarding low temperature discharge characteristics. The results are provided in FIG. 5.

Figure 5:
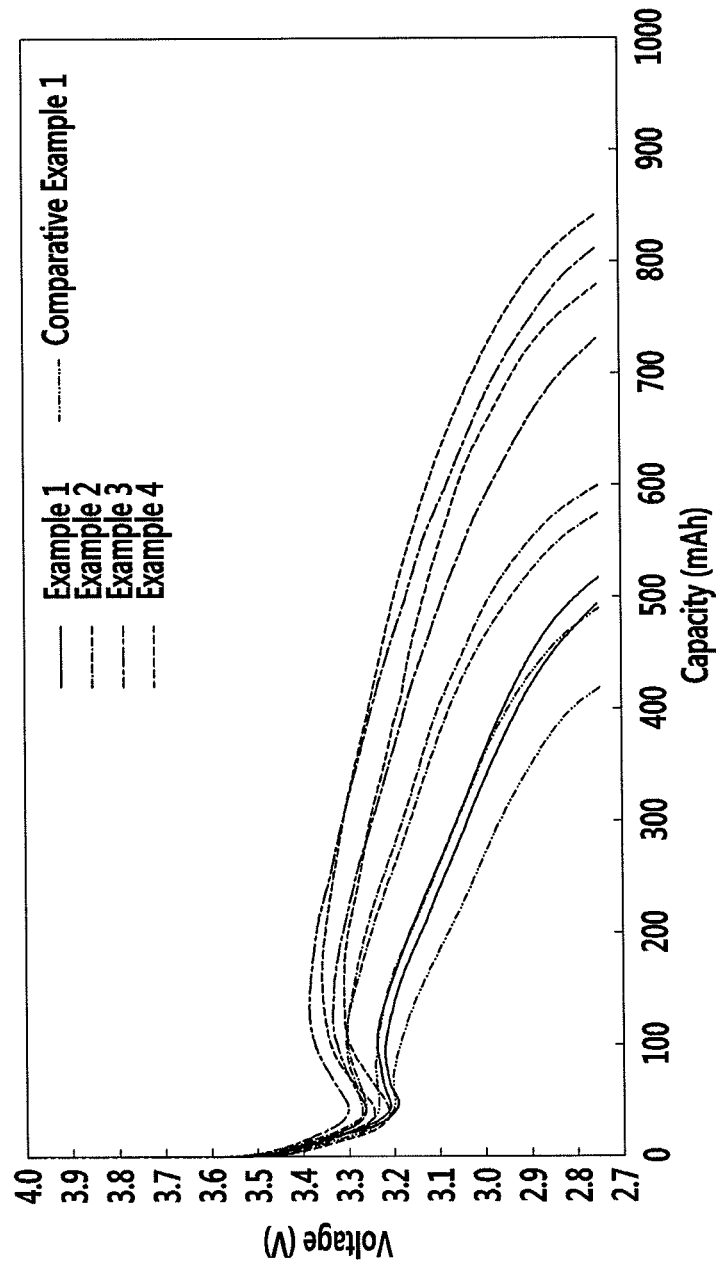
FIG. 5 illustrates a graph showing low temperature discharge characteristics of the rechargeable lithium battery cells according to Examples 1 to 4 and Comparative Example 1.

FIG. 5 is a graph showing low temperature discharge characteristics of the rechargeable lithium battery cells according to Examples 1 to 4 and Comparative Example 1.

Referring to FIG. 5, the rechargeable lithium battery cells that included one of the electrolyte compositions using ethylene carbonate, ethyl propionate, diethyl carbonate, and propylene carbonate within a respective ratio range according to Examples 1 to 4 had excellent low temperature discharge characteristics compared with the rechargeable lithium battery cell including an electrolyte composition using no propylene carbonate according to Comparative Example 1.

By way of summation and review, a rechargeable lithium battery may be provided by injecting an electrolyte into an electrode assembly including a positive electrode including a positive active material that can intercalate and deintercalate lithium, and a negative electrode including a negative active material that can intercalate and deintercalate lithium. However, a high voltage rechargeable lithium battery may have decreased cycle-life characteristics at a high temperature.

Embodiments are directed to an electrolyte for a rechargeable lithium battery that may provide improved high temperature cycle-life characteristics and high-rate charge and discharge characteristics at a high voltage.

Embodiments are directed to a rechargeable lithium battery including an electrolyte that may provide improved high temperature cycle-life characteristics and high-rate charge and discharge characteristics at a high voltage.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. An electrolyte for a rechargeable lithium battery, the electrolyte comprising:
   a lithium salt and a non-aqueous organic solvent,
   wherein the non-aqueous organic solvent includes:
   about 15 volume % to about 35 volume % of ethylene carbonate,
   about 1 volume % to about 50 volume % of ethyl propionate,
   about 1 volume % to about 50 volume % of diethyl carbonate, and
   about 1 volume % to about 40 volume % of propylene carbonate.

2. The electrolyte as claimed in claim 1, wherein the non-aqueous organic solvent includes:
   about 10 volume % to about 50 volume % of ethyl propionate,
   about 10 volume % to about 50 volume % of diethyl carbonate, and
   about 1 volume % to about 30 volume % of propylene carbonate.

3. The electrolyte for a rechargeable lithium battery as claimed in claim 1, wherein the ethyl propionate is included in a same amount as, or in a greater amount than, the propylene carbonate.

4. The electrolyte for a rechargeable lithium battery as claimed in claim 1, wherein the ethyl propionate and the propylene carbonate are included at a volume ratio of about 1:1 to about 5:1.

5. The electrolyte for a rechargeable lithium battery as claimed in claim 1, wherein the ethyl propionate and the propylene carbonate are included at a volume ratio of about 1.3:1 to about 3.5:1.

6. The electrolyte for a rechargeable lithium battery as claimed in claim 1, wherein:
   the electrolyte further includes an additive, and
   the additive includes fluoroethylene carbonate, vinylethylene carbonate, propane sultone, succinonitrile, adiponitrile, or a combination thereof.

7. The electrolyte for a rechargeable lithium battery as claimed in claim 6, wherein the additive is included in an amount of about 0.1 parts by weight to about 20 parts by weight based on 100 parts by weight of the non-aqueous organic solvent.

8. A rechargeable lithium battery, comprising
   a positive electrode;
   negative electrode; and
   an electrolyte as claimed in claim 1.

9. The electrolyte for a rechargeable lithium battery as claimed in claim 1, wherein the non-aqueous organic solvent includes about 1 volume % to about 40 volume % of ethyl propionate.

10. An electrolyte for a rechargeable lithium battery, the electrolyte comprising:
    a lithium salt and a non-aqueous organic solvent,
    wherein the non-aqueous organic solvent includes:
    about 1 volume % to about 40 volume % of ethylene carbonate,
    about 1 volume % to about 50 volume % of ethyl propionate,
    about 1 volume % to about 50 volume % of diethyl carbonate, and
    about 1 volume % to about 40 volume % of propylene carbonate,
    wherein the ethyl propionate is included in a same amount as the propylene carbonate.

11. The electrolyte for a rechargeable lithium battery as claimed in claim 10, wherein the non-aqueous organic solvent includes about 15 volume % to about 35 volume % of ethylene carbonate.

* * * * *